(12) United States Patent
Ryle et al.

(10) Patent No.: US 7,020,814 B2
(45) Date of Patent: Mar. 28, 2006

(54) METHOD AND SYSTEM FOR EMULATING A FIBER CHANNEL LINK OVER A SONET/SDH PATH

(75) Inventors: Thomas Eric Ryle, Raleigh, NC (US); Ganesh Sundaram, Rohnert Park, CA (US); Hitesh Amin, Petaluma, CA (US); Vikram Devdas, Petaluma, CA (US); John Diab, Santa Rosa, CA (US); Fuchun Jiang, Chapel Hill, NC (US); Charles Allen Carriker, Jr., Cary, NC (US); Marc Alan Bennett, Austin, TX (US)

(73) Assignee: Cisco Technology, Inc., San Jose, CA (US)

( * ) Notice: Subject to any disclaimer, the term of this patent is extended or adjusted under 35 U.S.C. 154(b) by 254 days.

(21) Appl. No.: 10/390,813

(22) Filed: Mar. 18, 2003

(65) Prior Publication Data

US 2005/0010849 A1    Jan. 13, 2005

(51) Int. Cl.
*G01R 31/28* (2006.01)
(52) U.S. Cl. ....................... 714/712; 370/216
(58) Field of Classification Search ............... 714/712, 714/738; 370/216; 398/5, 33; 327/333
See application file for complete search history.

(56) References Cited

U.S. PATENT DOCUMENTS

| | | | | |
|---|---|---|---|---|
| 5,610,745 | A | 3/1997 | Bennett | 359/139 |
| 5,638,518 | A | 6/1997 | Malladi | 395/200.21 |
| 5,923,677 | A * | 7/1999 | Aihara | 714/738 |
| 5,941,972 | A | 8/1999 | Hoese et al. | 710/129 |
| 5,959,489 | A * | 9/1999 | Walck | 327/333 |
| 5,959,994 | A | 9/1999 | Boggs et al. | 370/399 |
| 6,393,489 | B1 | 5/2002 | Sambamurthy et al. | 709/250 |
| 6,400,730 | B1 | 6/2002 | Latif et al. | 370/466 |
| 6,452,906 | B1 | 9/2002 | Afferton et al. | |
| 6,636,529 | B1 | 10/2003 | Goodman et al. | 370/469 |
| 6,654,383 | B1 | 11/2003 | Haymes et al. | 370/466 |
| 2001/0043560 | A1 * | 11/2001 | Liu et al. | 370/216 |
| 2002/0083190 | A1 | 6/2002 | Kamiya et al. | |
| 2002/0176450 | A1 | 11/2002 | Kong et al. | 370/539 |
| 2003/0039207 | A1 * | 2/2003 | Maeda et al. | 370/216 |
| 2003/0074449 | A1 | 4/2003 | Smith et al. | 709/226 |
| 2003/0091037 | A1 | 5/2003 | Latif et al. | 370/355 |
| 2003/0218981 | A1 | 11/2003 | Scholten | 370/235 |
| 2004/0052520 | A1 * | 3/2004 | Halgren et al. | 398/5 |
| 2004/0076175 | A1 | 4/2004 | Patenaude | 370/465 |
| 2004/0085902 | A1 | 5/2004 | Miller et al. | 370/235 |
| 2004/0085904 | A1 | 5/2004 | Bordogna et al. | 370/236 |
| 2004/0114924 | A1 * | 6/2004 | Holness et al. | 398/33 |

\* cited by examiner

*Primary Examiner*—Albert Decady
*Assistant Examiner*—Dipakkumar Gandhi
(74) *Attorney, Agent, or Firm*—Aka Chan LLP (57) ABSTRACT

A method and system for emulating an Fibre Channel link over a SONET transport path by which Fibre Channel data is transported across the SONET/SDH transport path. To provide link integrity, techniques to handle link failures from a Fibre Channel element to its associated Fibre Channel port, or of the SONET/SDH network linking Fibre Channel ports include transmitting error condition codes over the SONET/SDH transport path overhead to a remote Fibre Channel transport interface so that the Fibre Channel link from the remote Fibre Channel transport interface to the associated remote Fibre Channel port is disabled. Timing the length of failures and return of operation of the failed links is used to handle transient conditions and to avoid link bouncing.

29 Claims, 9 Drawing Sheets

| Timer | Description | Default Setting |
|---|---|---|
| 1 | SONET Path up wait after provisioning | 500ms |
| 2 | Fibre Channel port up timeout after activation | 20ms (can be increased if link rate auto-detect is implemented) |
| 3 | SONET Path error soaking timeout (time to wait until permanent error is determined) | 200ms |
| 4 | SONET Path stable timeout after error (time to wait until SONET Path is considered error free) | 100ms |
| 5 | Fibre Channel port stable timeout (time to wait until Fibre Channel port is considered up after link down) | 15ms (can be increased if link rate auto-detect is implemented) |
| 6 | PDI active condition detected soaking time | 15ms |
| 7 | PDI inactive condition detected soaking time (only used in TRANSPORT_REMOTE_ERROR state) | 15ms |
| 8 | Software detection initial error condition timeout, duration of 10B_ERR code generation until transmit laser is disabled | 3ms |

FIG. 5

| State | Transitions | | |
|---|---|---|---|
| | Next State | Cause of Transition | Action Taken on Transition |
| INACTIVE | 1) TRANSPORT_INIT | SONET/SDH/GFP Circuit Created | Initialize Fibre Channel port settings |
| TRANSPORT_INIT | 1) TRANSPORT_ERROR | SONET/SDH/GFP path error detected (timer 3) | Send PDI indication to remote Fibre Channel port (only if SONET/SDH error is not RDIP) (remote Fibre Channel port will turn off its transmit laser). |
| | 2) FIBRE_PORT_INIT | SONET/SDH/GFP Up Wait completed (timer 1) and is error free (timer 3) | none |
| FIBRE_PORT_INIT | 1) FIBRE_PORT_DOWN | Fibre Channel port active timeout (timer 2), or port is not enabled. | Send PDI indication to remote Fibre Channel port (remote Fibre Channel port will turn off its transmit laser). |
| | 2) FIBRE_PORT_ACTIVE | Fibre Channel port detected Active | Turn on local Fibre Channel port transmit laser. |
| FIBRE_PORT_ACTIVE | 1) TRANSPORT_ERROR_1 | SONET/SDH/GFP Path error detected (timer 3) | Send PDI indication to remote Fibre Channel port (only if SONET/SDH error is not RDIP) (remote Fibre Channel port will turn send 10B_ERR codes) and force 10B_ERR transmission. |
| | 2) REMOTE_ERROR_1 | Remote PDI error indication detected active (timer 6) | Force 10B_ERR transmission. |
| | 3) FIBRE_PORT_DOWN | Fibre Channel port detected inactive (no timer used) | Send PDI indication to remote Fibre Channel port (remote Fibre Channel port will turn on its transmit laser). |
| TRANSPORT_ERROR_1 | 1) FIBRE_PORT_INIT | SONET/SDH/GFP circuit error free and stable (timer 4) | Remove PDI indication to remote Fibre Channel port (remote Fibre Channel port will turn on its transmit laser). |
| | 2) TRANSPORT_ERROR_2 | SONET/SDH/GFP circuit error detected for long duration (timer 8) | Turn off transmit laser. |
| TRANSPORT_ERROR_2 | 1) FIBRE_PORT_INIT | SONET/SDH/GFP circuit error free and stable (timer 4) | Remove PDI indication to remote Fibre Channel port (remote Fibre Channel port will turn on its transmit laser). |
| REMOTE_ERROR_1 | 1) FIBRE_PORT_INIT | Remote PDI error indication detected inactive (timer 7) | none |
| | 2) REMOTE_ERROR_2 | Remote PDI error indication detected active for long duration (timer 8) | Turn off transmit laser |
| REMOTE_ERROR_2 | 1) FIBRE_PORT_INIT | Remote PDI error indication detected inactive (timer 7) | none |
| FIBRE_PORT_DOWN | 1) FIBRE_PORT_ACTIVE | Fibre Channel port detected active and stable (timer 5) | Remove PDI indication to remote Fibre Channel port (remote Fibre Channel port will turn on its transmit laser). |
| All States (except INACTIVE) | INACTIVE | SONET/SDH Circuit deleted | Remove PDI indication to remote Fibre Channel port (if driven) and disable local Fibre Channel port. |

METHOD AND SYSTEM FOR EMULATING A FIBER CHANNEL LINK OVER A SONET/SDH PATH

BACKGROUND OF THE INVENTION

The present invention relates generally to digital communication networks, and more specifically, to Fibre Channel transport over a SONET path.

SONET/SDH and optical fiber have emerged as significant technologies for building large scale, high speed, Internet Protocol (IP) based networks. SONET, an acronym for Synchronous Optical Network, and SDH, an acronym for Synchronous Digital Hierarchy, are a set of related standards for synchronous data transmission over fiber optic networks. SONET/SDH is currently used in wide area networks (WAN) and metropolitan area networks (MAN). A SONET system consists of switches, multiplexers, and repeaters, all connected by fiber. The connection between a source and destination is called a path.

One network architecture for the interconnection of computer devices in network communication is Fibre Channel, the core standard of which is described in ANSI (American National Standards Institute) X3.230-1994. Arising out of data storage requirements, Fibre Channel currently provides for gigabit-per-second transport over distances up to 10 kilometers in Fibre Channel frames that consist of standardized sets of bits used to carry data over the network system.

To combine the advantages of the SONET/SDH and Fibre Channel technologies, it is desirable to provide Fibre Channel transport over SONET/SDH networks, i.e., to map one or more Fibre Channel ports to a SONET/SDH path for transport across a SONET/SDH network. With a Fibre Channel transport over SONET/SDH product at each end of a SONET/SDH path, a method is needed for the Fibre Channel over SONET/SDH transport path to behave transparently so that its behavior emulates a direct Fibre Channel connection between end stations connected to the Fibre Channel over SONET/SDH equipment. In order to do this, a Fibre Channel port at one end of a SONET/SDH transport path must be able to bring down its link when the corresponding Fibre Channel port at a second end of the SONET/SDH path is down, i.e., unable to transmit or receive data, or when the SONET/SDH path is not operable.

Heretofore, the only method of determining whether a remote port or network node was down has been through layer 2 connection level protocols, such as PPP (Point-to-Point Protocol) signaling. However, such connection level protocols are burdensome because these protocols must be implemented at each port or node, resulting in additional and undesirable overhead. In fact, there is no PPP protocol for Fibre Channel. Higher level protocols, such as SCSI, are required to handle this operation for Fibre Channel. Such arrangements may be inefficient since several send frame sequence retries may be required before an upper level protocol time limit is reached and the upper level protocol recognizes that a remote port or node is down. Furthermore, such arrangements interfere with the ability for ISLs (inter-switch links), which are trunk connections between Fibre Channel switches consisting of multiple links, to be reconfigured so that resources may be reallocated to different links.

The Fibre Channel transport over SONET/SDH networks should also be resilient to SONET/SDH protection switches (i.e., from UPSR, BLSR, etc.), within the path which can cause traffic disruption. In order to do this, the implementation should provide for minimal frame loss during SONET switches. Also, it should not bring down links during a SONET switchover unless there is a permanent failure condition within the SONET transport path.

SUMMARY OF THE INVENTION

A method and system for emulating an Fibre Channel link over a SONET transport path are disclosed.

In one aspect of the invention, the present invention provides for a method of emulating a Fibre Channel link over a SONET/SDH transport path having the steps of detecting a SONET/SDH transport path failure; timing the SONET/SDH transport path failure to determine that the failure is nontransient; and disabling a Fibre Channel link from a local Fibre Channel transport interface to a local Fibre Channel port upon a determination that failure is nontransient to avoid inadvertent disabling of the local Fibre Channel port due to transient SONET/SDH error conditions. The method also includes sending an error condition code in a SONET/SDH path overhead to a remote Fibre Channel transport interface to disable a remote Fibre Channel port link. For the return of normal operation, the method includes detecting a return into operation of the SONET/SDH transport path; timing the return to determine that the return is nontransient; enabling the local Fibre Channel port link to avoid inadvertent enabling of the local Fibre Channel port link due to transient SONET/SDH error conditions; and removing the error condition code in the SONET/SDH path overhead to enable the remote Fibre Channel port link.

In another aspect of the invention, the present invention provides for a method of emulating a Fibre Channel link over a SONET/SDH transport path with link integrity. The method comprises detecting a failure of a Fibre Channel link from a local Fibre Channel port to an associated local Fibre Channel transport interface; determining that the failure is nontransient by timing; generating error condition codes; and transmitting the codes over a SONET/SDH transport path overhead to a remote Fibre Channel transport interface so that the Fibre Channel link from the remote Fibre Channel transport interface to an associated Fibre Channel port is disabled after a predetermined amount of time. The method also includes determining a return into operation of the Fibre Channel link from the local Fibre Channel port to the local Fibre Channel transport interface; timing the return into operation to determine that the return is nontransient; and removing the error condition code in the SONET/SDH transport path overhead transmission to the remote Fibre Channel transport interface to enable the remote Fibre Channel port link.

In another aspect of the invention, a system for emulating an Fibre Channel link over a SONET/SDH transport path generally comprises at least one processor configured to detect a failure of the SONET/SDH transport path, to time the failure of the SONET/SDH transport path to determine that the failure is nontransient; and responsive to a determination that the failure is nontransient, to disable a Fibre Channel link from a Fibre Channel transport interface to an associated Fibre Channel port.

In yet another aspect of the invention in which GFP (Generic Framing Procedure) provides the transport mechanism of the Fibre Channel frames over the SONET/SDH transport path, a system is provided for emulating an Fibre Channel link over the SONET/SDH transport path generally comprising at least one integrated circuit to detect a failure on a Fibre Channel link from a Fibre Channel port to an associated Fibre Channel transport interface, to generate special GFP-encapsulated frames upon detecting the failure, and to transmit the special GFP-encapsulate frames over the SONET/SDH transport path to a remote Fibre Channel transport interface to disable a Fibre Channel link from the remote Fibre Channel transport interface to an associated Fibre Channel port; and at least one processor configured to time the failure of the Fibre Channel link from the Fibre Channel element to its associated local Fibre Channel port to determine that the failure is nontransient; and responsive to a determination that the failure is nontransient, to generate and transmit error condition codes to the remote Fibre Channel transport interface. The integrated circuit is preferably embodied in an ASIC or a FPGA; and the processor is configured by software code stored in at least one memory subsystem which is coupled to the processor.

The above is a brief description of some of the deficiencies in the prior art and features of the present invention. Other features, advantages, and embodiments of the invention will be apparent to those skilled in the art from the following description, drawings, and claims.

BRIEF DESCRIPTION OF THE DRAWINGS

FIG. 6 is a table listing state transitions for the system of FIG. 2.

Corresponding reference characters indicate corresponding parts throughout the several views of the drawings.

DESCRIPTION OF SPECIFIC EMBODIMENTS

The following description is presented to enable one of ordinary skill in the art to make and use the invention. Descriptions of specific embodiments and applications are provided only as examples and various modifications will be readily apparent to those skilled in the art. The general principles described herein may be applied to other embodiments and applications without departing from the scope of the invention. Thus, the present invention is not to be limited to the embodiments shown, but is to be accorded the widest scope consistent with the principles and features described herein. For purpose of clarity, details relating to technical material that is known in the technical fields related to the invention have not been described in detail.

A method and system set forth herein is used to emulate a Fibre Channel link over a SONET/SDH transport path. The emulated Fibre Channel link allows Fibre Channel frames to be passed transparently over the SONET/SDH path in a generally unaltered condition. Various Fibre Channel over SONET/SDH framing protocols, such as HDLC, frame-mapped GFP (GFP-F), and transparent GFP (GFP-T), for example, may be used for the transport of Fibre Channel frames over a SONET/SDH transport path. As described in detail below for one specific embodiment using Generic Framing Procedure (GFP), the system provides for link integrity through the use of special GFP-encapsulated frames and error codes sent between Fibre Channel ports, link stability by using timers to prevent disabling port links due to transient SONET errors, and link availability (i.e., carrier class availability or errorless reset) by allowing the emulated link to be unaffected by hardware/processor resets or software upgrades. Furthermore, provisioning changes to one Fibre Channel port does not affect the data traffic on other active Fibre Channel ports. The emulated link remains unaffected because in a software reload operation, a transport interface card which typically performs the functions of the emulated link is reset by a card warm reset or boot. This only results in a processor reset. In contrast, a reset of a hardware module is only done by a power on reset. The card software determines the state of the hardware before initialization. It does not re-initialize the hardware after a warm boot. In this way, the state of the hardware is preserved.

Figure 1:
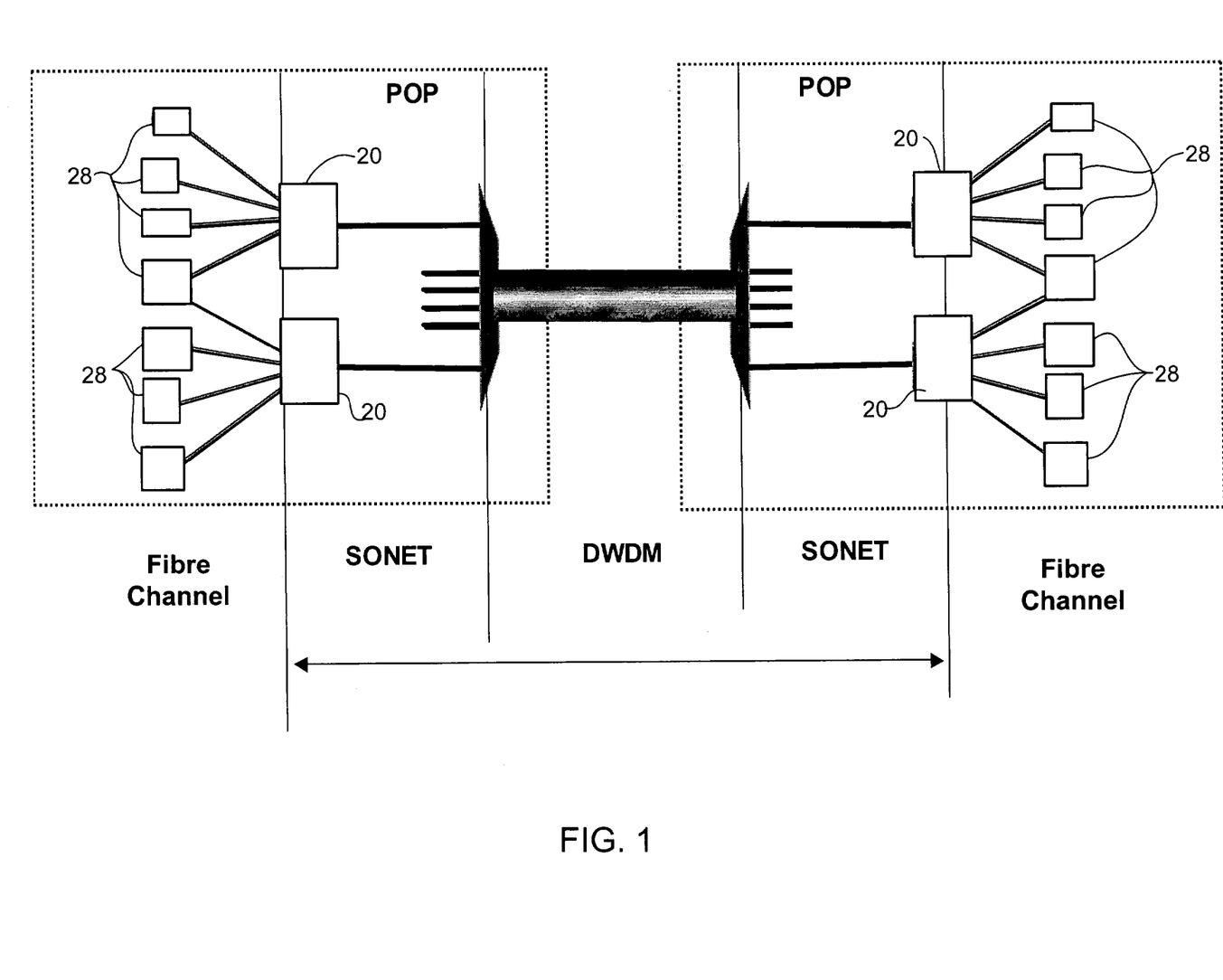
FIG. 1 is a diagram illustrating an exemplary network employing a system of the present invention.

The present invention operates in the context of a data communication network including multiple network elements. As shown in FIG. 1, an exemplary system may include a DWDM (Dense Wavelength Division Multiplexing) network connecting two SONET/SDH networks. Each SONET network is coupled to a Fibre Channel network. The DWDM network combines multiple optical signals so that they can be amplified as a group and transported over a single fiber to increase capacity. Each signal can be at a different rate and in a different format. DWDM applications include ultra-high bandwidth long haul, as well as ultra-high-speed metropolitan or inner city-networks, and at the edge of other networks, such as SONET/SDH.

Figure 2:
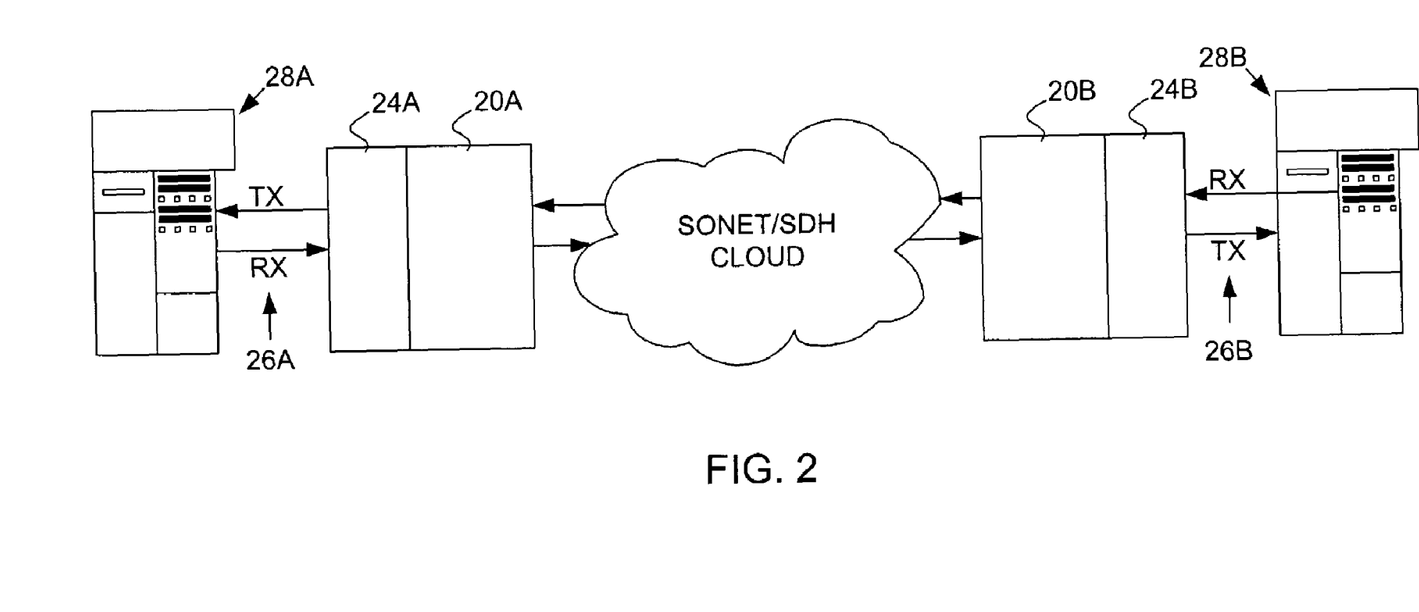
FIG. 2 is a diagram of a portion of the system of FIG. 1, including Fibre Channel ports.

An optical transport platform 20, such as ONS 15454 (available from Cisco Systems, Inc.) may be used at the SONET and Fibre Channel interface (FIGS. 1 and 2). The system of the present invention may be placed, for example, into a multi-port Fibre Channel card adapted to fit into the optical transport platform 20. Through the Fibre Channel port cards which function as transport interfaces with the platform 20, the Fibre Channel paths are connected to Fibre Channel ports 28 for such elements as data storage elements, including disk drive arrays, RAIDs, disk farms, or possibly Fibre Channel network elements, such as routers, switches, or other Fibre Channel network elements. While other framing protocols as described previously may be used, Fibre Channel data are encapsulated, sent over the SONET/SDH network, and decapsulated through the use of Generic Framing Procedure (GFP). In particular, transparent Generic Framing Procedure (GFP-T) is suitable for this purpose. The Fibre Channel ports at the transmitting and receiving ends are implemented to follow GFP to handle the Fibre Channel payloads appropriately.

FIG. 2 illustrates the exemplary Fiber Channel over SONET/SDH network of FIG. 1 in greater detail. A Fibre Channel port card 24A is connected by a Fibre Channel link 26A to a Fibre Channel port 28A for an unspecified element; likewise, a second Fibre Channel port card 24B is connected to another Fibre Channel link 26B to another Fibre Channel port 28B for another unspecified element. The Fibre Channel port card 24A, as part of the optical transport platform 20A, is connected through SONET/SDH network(s) (the DWDM network is not shown) to the second Fibre Channel port card 24B, also part of a second optical transport platform 20B. As illustrated in FIG. 2, there are two virtual wires for the connection between the representative Fibre Channel ports 28A and 28B which must be emulated for the required end-to-end link integrity of the Fibre Channel over SONET/SDH transport network. The features described below support this emulation.

The two virtual wires represent the connection from the Fibre Channel port 28A to the Fibre Channel port 28B, and the connection from Fibre Channel port 28B to the Fibre Channel port 28A. Taking one of these transport paths as an example, a loss of connection from the Fibre Channel port 28A to the Fibre Channel port 28B can occur with an inability to send data along three links: 1) from the Fibre Channel port card 24A to the Fibre Channel port card 24B, i.e., SONET/SDH transport failure; 2) from the Fibre Channel port 28A to the Fibre Channel port card 24A, i.e., the Fibre Channel link 26A is down; and 3) from the Fibre Channel port card 24B to the Fibre Channel port 28B. To attain the required emulation, transport control features are provided to support the integrity of links 1) and 2). Fibre Channel protocols automatically support the integrity of link 3).

It should be noted that the ports 28A and 28B might be ports for Fibre Channel switches and the Fibre Channel over SONET/SDH transport path described above might be part of one of more links within an interswitch link (ISL), a trunk connection between Fibre Channel switches consisting of multiple network links. The present invention allows for the realization of such complex network connections, besides the more straightforward network connections of data storage elements, for example, typically found in Fibre Channel networks.

SONET/SDH Transport Failure

With the failure of Fibre Channel link 1) as described above, the Fibre Channel port cards 24A and 24B cannot receive data across the SONET/SDH network, i.e., the SONET/SDH transport has been lost. The SONET/SDH transport includes the SONET/SDH path, as well as the method used to encapsulate Fibre Channel data into the SONET/SDH payload, i.e., SONET transport errors include a local SONET error, e.g., AISP, LOPP, UNEQP, PLMP and TIMP; a remote SONET error, e.g., RDIP. Where the Fibre Channel over SONET/SDH framing protocol is GFP-T, SONET transport errors also include loss of character delineation, loss of scrambling synchronization or inability to recover GFP frames from the SONET payload. If a local Fibre Channel port card 24A detects a local or remote SONET error, or a data encapsulation (GFP) error, the port card 24A determines whether the SONET/SDH transport error condition is nontransient or "permanent." The persistence of the error condition is timed to avoid the occurrence of a SONET/SDH protection switch or platform crossconnect switch and to avoid link bouncing. If the error condition is permanent, the Fibre Channel port card 24A generates and transmits 10B_ERR codes to its associated port 28A to force the port to lose data synchronization and the link from the port card 24A to its associated port 28B is brought down. If the condition persists for some period, the port card 24A then deactivates its transmit laser to its corresponding Fibre Channel port 28A.

At the time of the generation and transmission of its 10B_ERR codes, the port card 24 also transmits a PDI indication on the SONET/SDH circuit to the remote Fibre Channel port card 24B. The PDI indication is transmitted using a PDI code (0xFC) in the SONET/SDH path overhead signal label (the C2 byte). When the remote Fibre Channel port card 24B detects the PDI condition, it also generates and transmits 10B_ERR codes to its own Fibre Channel port 28B to force the port to lose data synchronization to bring its link down. If the PDI condition persists, the remote card 24B also deactivates its transmit laser to its corresponding Fibre Channel port 28B. Both ends of the Fibre Channel connection across the SONET/SDH transport path are disabled.

When the error condition is removed from the SONET/SDH transport, the detecting Fibre Channel port card 24A waits a predetermined amount of time before re-establishing its Fibre Channel link to its port 28A. The port card 24A also stops the transmission of the PDI indication to the remote port card 24B so it can re-establish its Fibre Channel link to the port 28B. Link bouncing is again avoided. Likewise, When the SONET/SDH transport path is provisioned or created, the path is verified to be error-free for a predetermined amount of time, i.e., the SONET/SDH path is "permanently" established, before a Fibre Channel port transmits data over the path.

For transient SONET/SDH error conditions, such as a path protection switch, there is a loss of GPF synchronization. During this condition, the GFP protocol prevents the reception of any Fibre Channel data from the SONET/SDH path. As a result, the port card sends only idle 8B/10B control words to its corresponding Fibre Channel port. When the transient error condition is removed, Fibre Channel protocol re-establishes the links.

With the failure of the SONET/SDH network, a Fibre Channel port card might receive errored transparent GFP (GFP-T) frames over the SONET/SDH transport path. If a GFP frame is received with a header which cannot be recovered, the frame is discarded since the GFP header contains information including the length of the GFP frame which is critical for the processing of the frame. On the other hand, if the header is intact, the Fibre Channel frame is passed along intact. It is more disruptive to Fibre Channel protocol to discard a group of 8B/10B control words than it is to pass the control words along unmodified.

Software is preferably used to implement this aspect of the present invention to handle the loss of SONET/SDH transport, though hardware can be used to implement the transmission and generation of the 10B_ERR codes to the associated Fibre Channel port.

Figure 4:
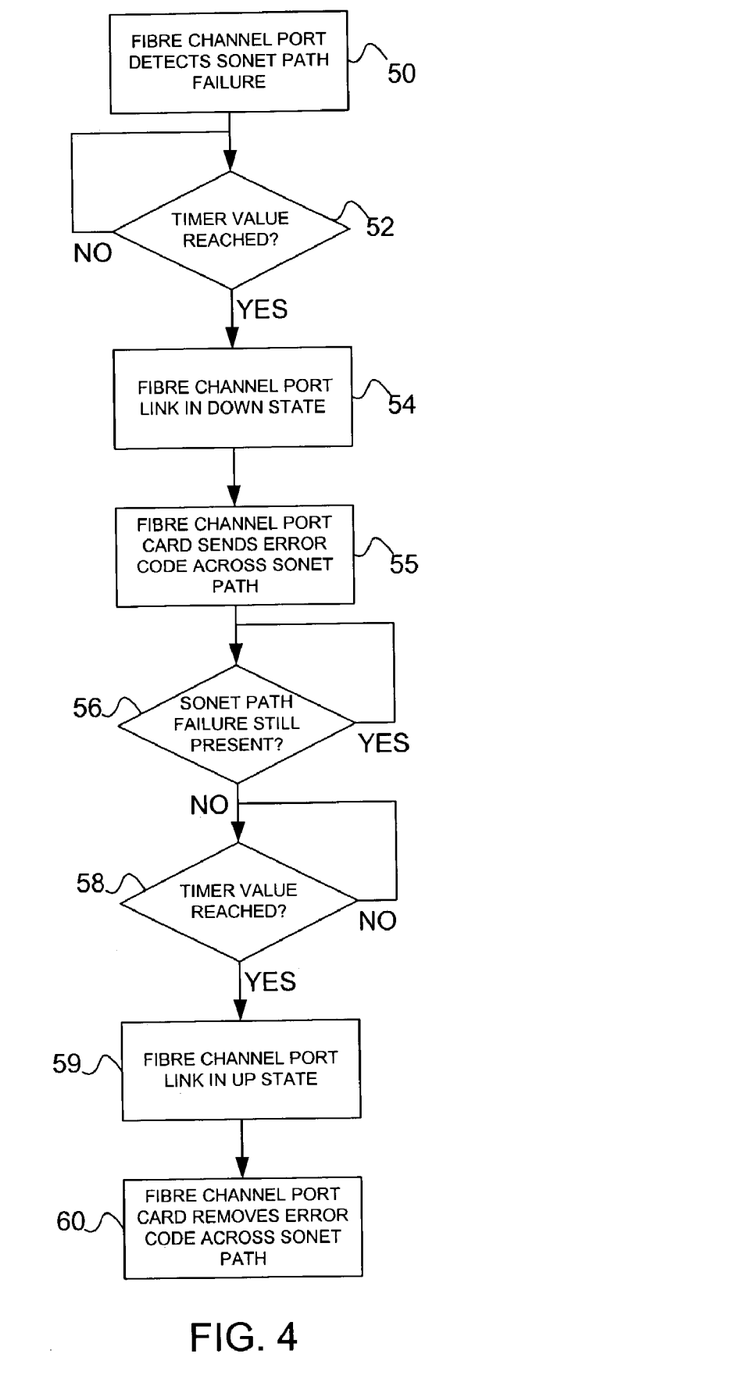
FIG. 4 is a flowchart illustrating a process for shutting down an Fibre Channel port upon detection of a SONET path failure.

With reference to the network connections of FIGS. 1 and 2, FIG. 4 is a flowchart of steps of a local Fibre Channel port card 24A when a permanent SONET path failure is detected. In step 50 the Fibre Channel port card 24A detects the SONET path failure. After determining that the SONET/SDH failure is not transient (there is a permanent SONET path failure at the local end, e.g., AISP, LOPP, UNEQP, PLMP error conditions, or at the far end, an RDIP error condition) by timing the error condition (step 52), the port card 24A puts the link to the Fibre Channel port 28A in a down state (step 54). As described previously, this is done in two steps. The local Fibre Channel port card 24A first generates and sends 10B_ERR codes to its Fibre Channel port 28A to force the port to lose synchronization of the data it receives. Then after some time (3 sec. in FIG. 5), the port card 24A disables its transmit laser to the port 28A. In the other direction, the Fibre Channel port 28A sends idle 8B/10B control words.

At the time of determining that the SONET/SDH failure is not transient, the local port card 24A also transmits a PDI code in the SONET/SDH path overhead signal label (the C2 byte) for the remote Fibre Channel port card 24B (step 55). The PDI code is not transmitted by the port card 24A if it detects a remote SONET/SDH (RDIP) error first. The port card 24B detects the remote error condition (RDIP) sent by the port card 24A and first generates and transmits 10B_ERR codes to force its Fibre Channel port 28B to lose data synchronization. After a period of time, the port card 24B deactivates its transmit laser and puts the port link in a down state. The remote Fibre Channel port 28B is prevented from receiving data, but continues to send idle 8B/10B control words in the opposite direction.

After the SONET/SDH path failure is removed and detected (step 56), the Fibre Channel port 24A reactivates its transmit laser and stops the generation of 10B_ERR codes to restore the link to its Fibre Channel element 28A (step 59). Again, the removal of the error condition must first be timed for a specified time before the SONET path is considered stable (step 58) and the link allowed to be brought up (step 59) to prevent the occurrence of link bouncing. The Fibre Channel port 24A removes the PDI indication by transmitting a valid C2 byte on the SONET/SDH path (step 60). An error code (e.g., 0xFC) may be used for this indication, where a normal setting (e.g., 0x01) may be used for the C2 byte when no error condition is present. The remote Fibre Channel port 24B detects the stability of the SONET/SDH path and reactivates its port transmit laser and stops the generation of 10B_ERR codes to restore the link to the Fibre Channel element 28B. The Fibre Channel link between the Fibre Channel elements 28A and 28B are then re-established through Fibre Channel link protocol.

Link Failure from Fibre Channel Port to Fibre Channel Port Card

With the failure of its Fibre Channel link 2) as described above, the Fibre Channel port card 24A, for example, cannot receive data from its corresponding Fibre Channel port 28A. That is, the port card 24A fails to receive signals from the port 28A, or fails to achieve synchronization for the signals. If either of these error conditions occurs on one (local) end of the connection, it is necessary to prevent link establishment on the remote end also. Returning to the example immediately above, if the local Fibre Channel port card 24A cannot receive data from the Fibre Channel port 28A, then it is necessary to prevent the remote Fibre Channel port 28B from receiving data from the Fibre Channel port card 24B.

In this embodiment GFP provides the encapsulation for the Fibre Channel frames. When the local port card detects a failure of the Fibre Channel link, the local Fibre Channel port card (together with its transport platform 20) generates and sends CSF (client signal fail) frames defined by GFP protocol standards, across the SONET/SDH network to the remote Fibre Channel port card (and its transport platform 20). The CSF frames are sent by transparent GFP (GFP-T) in the described embodiment. These frames are transmitted periodically while the error condition persists. When a CSF frame is received by the remote Fibre Channel port card, the card is forced into a continuous generation and transmission of 10B_ERR codes on the Fibre Channel link to its corresponding Fibre Channel port. This forces a loss of synchronization so that the Fibre Channel port cannot receive data from the remote Fibre Channel port card. The link from the remote Fibre Channel port card to its Fibre Channel port is shut down or disabled. This aspect of detecting the Fibre Channel link failure and the transmission of CSF frames by the local equipment along with the transmission of 10B_ERR codes by the remote equipment is best implemented in hardware to provide fast cutoff of the Fibre Channel link in the affected direction. The link in the other direction is treated independently.

In other operations of the Fibre Channel over SONET/SDH transport, Fibre Channel CRC-errored frames are sent over the SONET/SDH transport path without modification, and oversized and undersized Fibre Channel frames are discarded.

Figure 3A:
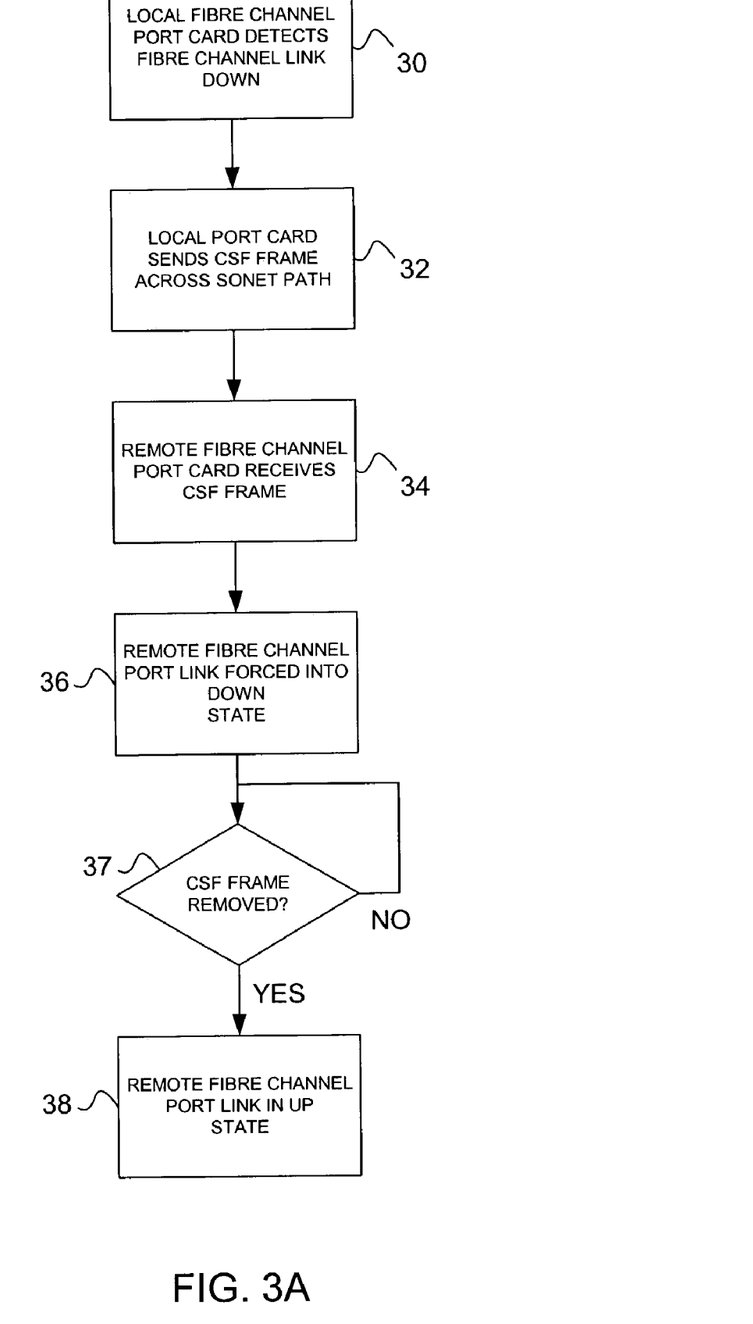
FIG. 3A is a flowchart illustrating a process for shutting down a far end Fibre Channel port upon detection of a local Fibre Channel link failure.

FIG. 3A is a flowchart of immediate operational steps of Fibre Channel port cards to disable a link from a remote Fibre Channel port card to its corresponding Fibre Channel port when a local Fibre Channel port card detects a Fibre Channel link failure. When the exemplary local port card 24A detects that its Fibre Channel link is in the down state (step 30), a client signal fail (CSF) frame is sent across the SONET path to the far end Fibre Channel port card 24B (step 32) periodically. The CSF frames are sent at a rate with a period between 100 to 1000 ms. When the remote Fibre Channel port card 24B detects the client signal fail (CSF) frame from the port card 24A (step 34), the remote Fibre Channel port card 24B transmits continuous 10B_ERR codes to its corresponding port 28B which prevents the port from receiving data. The invalid control words (10B_ERR), force a loss of synchronization in the Fibre Channel port 28B. The link from the Fibre Channel port card 24B to the Fibre Channel port 28B is brought down (step 36). As long as the Fibre Channel port card 24A cannot receive data from its Fibre Channel port 28A, the local Fibre Channel port card 24A continues to send the GFP-encapsulated CSF frames across the SONET/SDH network.

The link between the Fibre Channel port card 24B and its Fibre Channel port 28B is only disabled in the Fibre Channel transmit direction (Tx in FIG. 2) so that the Fibre Channel link loss is only propagated unidirectionally. This allows for communication to continue over the emulated Fibre Channel link in the opposite direction (i.e., from Fibre Channel port that received the error code to the local Fibre Channel port card with the original faulty link to its Fibre Channel port card (Rx in FIG. 2)) and to provide link integrity. In this example, the Fibre Channel port 28B through its port card 24B sends idle character words continually toward the Fibre Channel port 28A while the link from the port card 24B to the Fibre Channel port 28B is down.

When the link from the Fibre Channel port 28A to the Fibre Channel port card 24A is restored so that the Fibre Channel port card 24A now receives data from the port 28A, the Fibre Channel port card 24A stops transmitting CSF frames and sends idle character words instead to the Fibre Channel port card 24B (step 37), which then re-establishes the link from the port card 24B to the port28B (step 38). With idle character works in both directions, Fibre Channel protocol established or re-establishes the bidirectional links between the Fibre Channel ports 28A and 28B.

As stated above, it is preferable that these operations be implemented by hardware, an embodiment of which is described below. Hardware quickly brings down the remote Fibre Channel link when the local Fibre Channel link goes down, as described above.

In accordance with the present invention, if a "permanent" Fibre Channel link failure is detected, on the other hand, system software, rather than hardware, further disables the remote Fibre Channel port link by turning off the port transmit laser in the remote Fibre Channel port card. Besides determining whether the Fibre Channel link is down permanently, this aspect of the present invention also determines whether a return of the link is permanent to prevent link bouncing, and whether the link is operable after initialization.

With the network connections of FIGS. 1 and 2 as an example and a failure of its Fibre Channel link 2) as described above, the Fibre Channel port card 24A determines that the loss is permanent if the time the link is down exceeds a predetermined amount of time. Upon the determination that the loss is indeed permanent, the local port card 24A sends a link down indication over the SONET/SDH circuit by using a PDI (Payload Detect Indication) code (0xFC) in the SONET/SDH overhead signal label (C2 byte) to the remote Fibre Channel port card 24B. A normal setting (e.g., 0x01) may be used for the C2 byte when no error condition is present. Upon receiving the PDI code, the remote Fibre Channel port card 24B continues the transmission of 10B_ERR codes to its port 28B until a time limit is reached (3 seconds, for example, in the described embodiment) and disables its own transmit laser (Tx in FIG. 2) to its corresponding Fibre Channel port 28B. This two-step way of disabling a port link provides a more fluid way of taking the link down than simply turning off the transmit laser. It should be noted that the GFP-defined CSF frames are not used in this operation.

Upon detecting a return of the link from its Fibre Channel port 28A, the local port card 24A first determines that link is operable for a timed predetermined amount before it removes the PDI code to enable the remote port card 24B to either stop the generation of 10B_ERR codes or enable its transmit laser to the remote Fibre Channel port 28B. The timing of the link's return to operation is to prevent link bouncing.

Figure 3B:
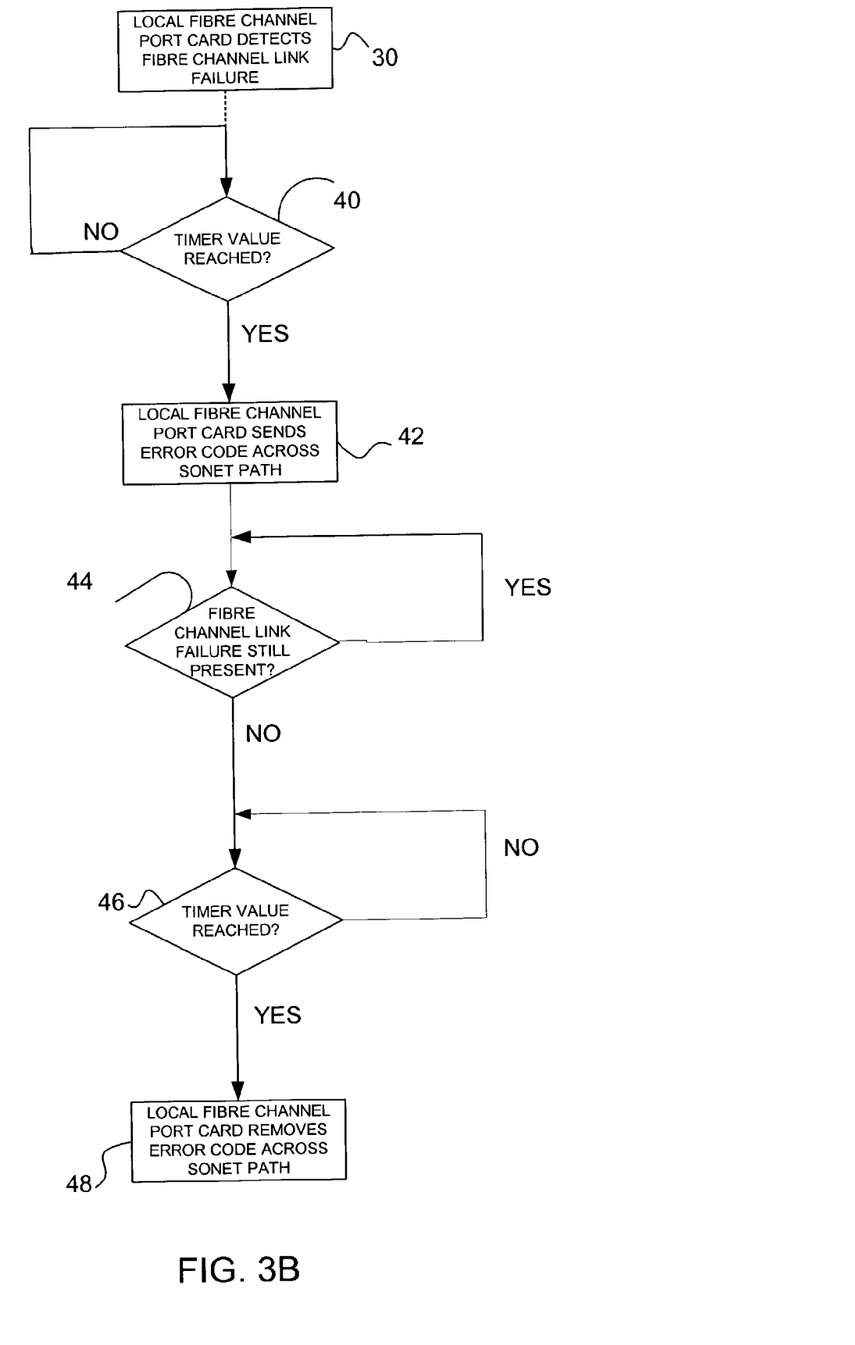
FIG. 3B is a flowchart illustrating a process for communicating a local Fibre Channel link failure to a far end Fibre Channel port when the local Fibre Channel port link failure persists and becomes nontransient or "permanent."

FIG. 3B is a flowchart of operational steps of a local Fibre Channel port when the Fibre Channel port link failure persists and becomes nontransient or "permanent." When the exemplary local port card 24A detects that its Fibre Channel link is lost (step 30), a timer is started. The subsequent immediate operations of the local and remote port cards 24A and 24B are described above with respect to FIG. 3A. After the step 36 and within the timing loop of step 37 of FIG. 3A, the local port card 24A determines whether the time limit which determines that the link failure is permanent (step 40). If the time limit has not been reached, the process continues to the decision step 37 of FIG. 3A. If the timer reaches the predetermined value (step 40) to indicate that the Fibre Channel link failure is permanent, the port card 24A sends a signaling error code across the SONET path to the remote Fibre Channel port card 24B (step 42); the signaling error code is inserted in the SONET path overhead, for example, a PDI indication in the C2byte. When the remote Fibre Channel port card 24B detects the remote error condition (RDIP) code from the port card 24A, the port card 24B which had been forced initially to generate and transmit continuous 10B_ERR code to its associated port 28B now starts its own timer before disabling its own transmit laser to the remote port 28B. The remote Fibre Channel port 28B continues to send idle 8B/10B control words in the other direction to the local Fibre Channel port card 24A.

The local Fibre Channel port card 24A continues to monitor for the restoration of its Fibre Channel link (step 44). When the link from the Fibre Channel port 28A is restored so that the Fibre Channel port card 24A now receives data from the port 28A, the Fibre Channel port card 24A times the restoration of the Fibre Channel link to ensure a nontransient condition (step 46). If such is the case, the local Fibre Channel port card 24A removes the PDI indication by transmitting a valid C2 byte on the SONET/SDH link overhead (step 48). As soon as the removal of the PDI signal is detected, the remote Fibre Channel port card 24B enables its associated transmit laser to enable the link from the Fibre Channel port card 24B to the Fibre Channel port 28B. The link between the Fibre Channel ports 28A and 28B is then fully re-established by Fibre Channel link protocol.

Figure 5:
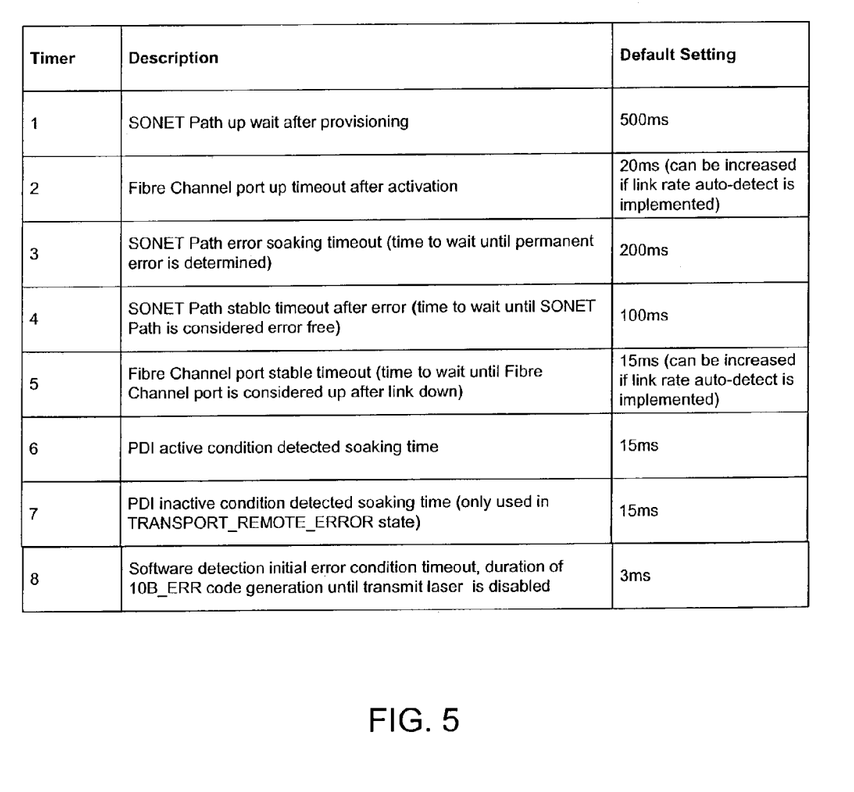
FIG. 5 is a table showing timers used by a state machine of the system of FIG. 2.

As previously discussed, the system includes timers which are used to determine how long an error condition is present (to ensure that a failure is permanent) and how long it is gone (to make sure that the SONET path is stable before link is brought back up). FIG. 5 lists some of these timers and other useful timers, and their default settings. It is to be understood that these settings are only examples and other values may be used without departing from the scope of the invention. Timer 1 provides for a delay to wait for the SONET path after network provisioning. Timer 2 is the Fibre Channel link up timeout after its activation. Timer 3 is a SONET path error soaking timeout. This is the time to wait until a permanent error is determined, such as for step 52 in FIG. 4. The time period selected is based on the worst case transient SONET error conditions. Timer 4 is a SONET path stable timeout after error and measures the time to wait until the SONET path is considered error-free, such as in step 58 in FIG. 4. Timer 5 is a Fibre Channel Link stable timeout to monitor the time to wait until a Fibre Channel link is considered established after link down. Timer 6 is the PDI (Payload Detect Indication) active condition detected soaking time; and timer 7 is the PDI inactive condition detected soaking time. Timer 7 is only used during transport remote error state (see the State Machine description below). Timer 8 allows a link between a Fibre Channel port card and its connected port to be broken gradually in steps.

Figure 7:
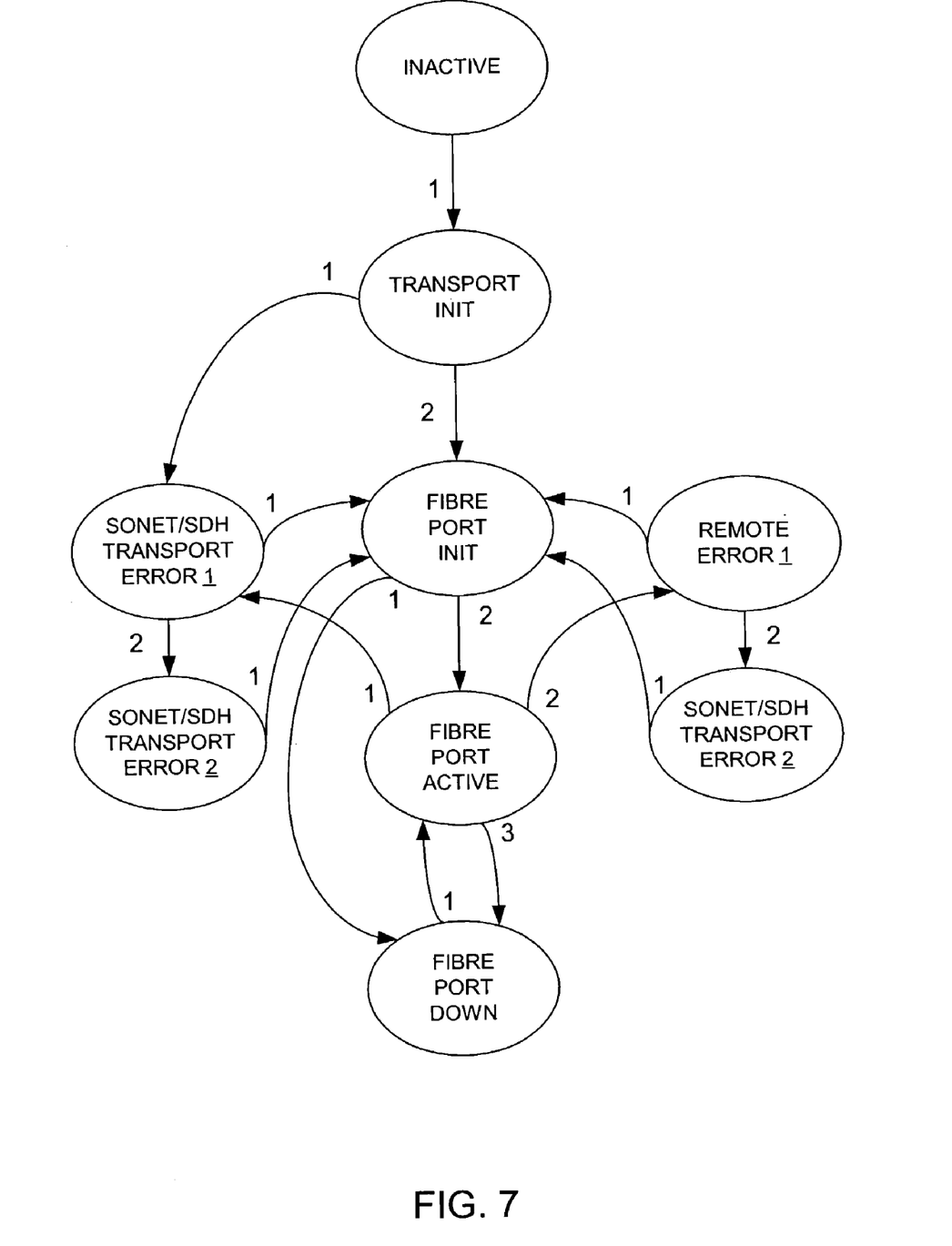
FIG. 7 is a state diagram of the system of FIG. 2.

FIG. 6 lists the states of the state machine system and the transitions of the system described above and FIG. 7 illustrates the system state machine and its transitions graphically. Transition numbers are shown in both FIGS. 6 and 7 and listed in order of priority (with 1 being the highest priority). From the inactive state, the SONET/SDH/GFP transport system is initiated. Once the transport system is initiated, the Fibre Channel port link is initiated if there are no transport errors (based on timers 1 and 3 of FIG. 5). In the Fibre Channel link initiation state, the Fibre Channel port may be detected as inactive (timer 2) or the Fibre Channel port detected as active. If the Fibre Channel port link is active, a transport error (timer 3) or remote PDI error (timer 6) may be detected, or the port may be detected inactive. Following a transport error, the Fibre Channel link may be initiated if the SONET circuit is error-free and stable (based on timer 4), or the Fibre Channel port link might be brought down if transport error persists sufficiently (timer 8). Following a remote error, the Fibre Channel port link may be initiated if the remote PDI error code is detected inactive (timer 7) or the Fibre Channel port link might be brought down if transport error persists sufficiently (timer 8). After the Fibre Channel port link is down, it may become active if the port is detected active and stable (based on timer 5). The inactive state is reached from all other states when the SONET circuit is deleted.

Hence with the operation described above, the end-to-end network path appears as a single Fibre Channel link to the attached Fibre Channel devices, such as switches and routers, and the link integrity function enables correct operation of functions which depend on Fibre Channel link state such as Fibre Channel, layer 2, or layer 3 based re-routing. A Fibre Channel link over a SONET/SDH transport path is emulated.

Figure 8:
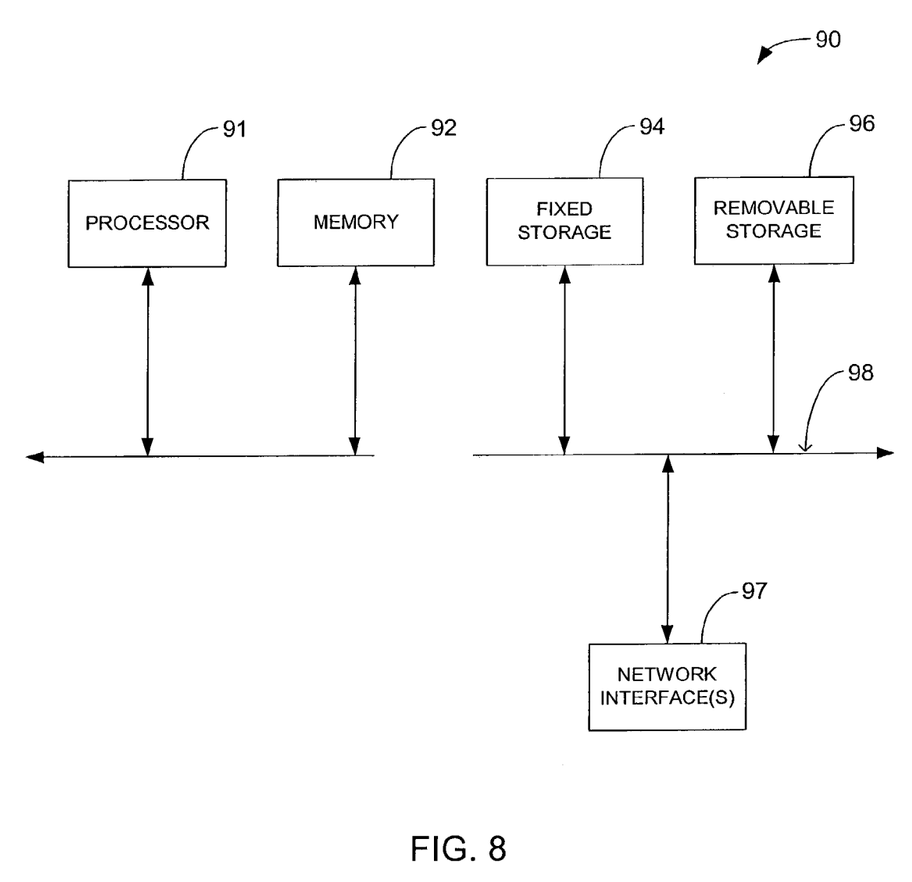
FIG. 8 is a system block diagram of a computer system that can be utilized to execute software of an embodiment of the present invention.

As described above, different aspects of the present invention are preferably embodied in software and hardware. FIG. 8 shows a block diagram of a computer system 90 that may be used to execute the software of an embodiment of the invention. The computer system 90 includes memory 92 which can be utilized to store and retrieve software programs incorporating computer code that implements aspects of the invention, data for use with the invention, and the like. Exemplary computer readable storage media include CD-ROM, floppy disk, tape, flash memory, system memory, and hard drive. Additionally, a data signal embodied in a carrier wave (e.g., in a network including the Internet) may be the computer readable storage medium. Computer system 90 further includes subsystems such as a central processor 91, fixed storage 94 (e.g., hard drive), removable storage 96 (e.g., CD-ROM drive), and one or more network interfaces 97. Other computer systems suitable for use with the invention may include additional or fewer subsystems. For example, computer system 90 may include more than one processor 91 (i.e., a multi-processor system) or a cache memory. The computer system 90 may also include a display, keyboard, and mouse (not shown) for use as a host.

The system bus architecture of computer system 90 is represented by arrows 98 in FIG. 8. However, these arrows are only illustrative of one possible interconnection scheme serving to link the subsystems. For example, a local bus may be utilized to connect the central processor 91 to the system memory 92. The computer system 90 shown in FIG. 8 is only one example of a computer system suitable for use with the invention. Other computer architectures having different configurations of subsystems may also be utilized. Communication between computers within the network is made possible with the use of communication protocols, which govern how computers exchange information over a network.

The system may also be implemented in hardware, such as an ASIC (Application Specific Integrated Circuit) controller or an FPGA (Field Programmable Gate Array) incorporating a state machine running macrocode, may be used. The hardware aspects of the present invention are preferably realized as one or more ASICs and FPGAs, while the software aspects of the present invention might be best realized by a computer system 90 described with respect to FIG. 8, running computer code stored in the memory subsystems 92, 94 and 96.

Although the present invention has been described in accordance with the embodiments shown, one of ordinary skill in the art will readily recognize that there could be variations made to the embodiments without departing from the scope of the present invention. Accordingly, it is intended that all matter contained in the above description and shown in the accompanying drawings shall be interpreted as illustrative and not in a limiting sense.

What is claimed is:

1. A method for emulating a Fibre Channel link over a SONET/SDH transport path and providing link integrity, the method comprising:
   transporting Fibre Channel data from a local Fibre Channel port through an associated local Fibre Channel transport interface over the SONET/SDH transport path through a remote Fibre Channel transport interface to an associated remote Fibre Channel port;
   detecting a failure of a Fibre Channel link from the local Fibre Channel port to the associated local Fibre Channel transport interface;
   timing the failure of the Fibre Channel link from the Fibre Channel port to its associated local Fibre Channel transport interface to determine that the failure is nontransient;
   generating error condition codes; and
   transmitting the error condition codes over the SONET/SDH transport path overhead to the remote Fibre Channel transport interface so that the Fibre Channel link from the remote Fibre Channel transport interface to the associated remote Fibre Channel port is disabled after a predetermined amount of time.

2. The method of claim 1 further comprising
   determining a return into operation of the Fibre Channel link from the local Fibre Channel port to the local Fibre Channel transport interface;
   timing the return into operation of the Fibre Channel link from the local Fibre Channel port to the local Fibre Channel transport interface to determine that the return is nontransient; and
   removing the error condition code in the SONET/SDH path overhead transmission to the remote Fibre Channel transport interface to enable the remote Fibre Channel port link.

3. The method of claim 2 wherein the error condition code removing step includes transmitting a valid code to the remote Fibre Channel transport interface.

4. A method for emulating a Fibre Channel link over a SONET/SDH transport path and providing link stability, the method comprising:
   transporting Fibre Channel data over the SONET/SDH transport path;
   detecting a SONET/SDH transport path failure;
   timing the SONET/SDH transport path failure to determine that the failure is nontransient; and
   disabling a local Fibre Channel port link upon a determination that the failure is nontransient;
   wherein inadvertent disabling of the local Fibre Channel port link due to transient SONET/SDH error conditions is avoided.

5. The method of claim 4 wherein the disabling step comprises
   preventing the local Fibre Channel port from receiving data from the local Fibre Channel transport interface.

6. The method of claim 5 further comprising
   disabling a local Fibre Channel transport interface transmit laser to the local Fibre Channel port after a predetermined amount of time.

7. The method of claim 4 further comprising
   detecting a return into operation of the SONET/SDH transport path;
   timing the return into operation of the SONET/SDH transport path failure to determine that the return is nontransient; and
   enabling the local Fibre Channel port link to avoid inadvertent enabling of the local Fibre Channel port link due to transient SONET/SDH error conditions.

8. The method of claim 4 further comprising
   sending an error condition code in a SONET/SDH path overhead to a remote Fibre Channel transport interface to disable a remote Fibre Channel port link to emulate a Fibre Channel link from the Fibre Channel port associated with the local Fibre Channel transport interface to a Fibre Channel port associated with the remote Fibre Channel transport interface.

9. The method of claim 8 wherein the remote Fibre Channel port link is disabled by preventing the remote Fibre Channel port from receiving data from the remote Fibre Channel transport interface.

10. The method or claim 9 further comprising disabling a remote Fibre Channel transport interface transmit laser to the remote Fibre Channel port after a predetermined amount of time.

11. The method of claim 8 further comprising receiving character words from the Fibre Channel port associated with the remote Fibre Channel transport interface to indicate that the remote Fibre Channel port link is disabled.

12. The method of claim 8 further comprising
detecting a return into operation of the SONET/SDH transport path;
timing the return into operation of the SONET/SDH transport path failure to determine that the return is nontransient; and
removing the error condition code in the SONET/SDH path overhead transmission to the remote Fibre Channel transport interface to enable the remote Fibre Channel port link.

13. The method of claim 12 wherein the error condition code removing step includes transmitting a valid code to the remote Fibre Channel transport interface.

14. A system for emulating a Fibre Channel link over a SONET/SDH transport path, the system comprising:
at least one integrated circuit to transport Fibre Channel data from a local Fibre Channel port through an associated local Fibre Channel transport interface over the SONET/SDH transport path and to detect a failure on a Fibre Channel link from the local Fibre Channel port to the associated Fibre Channel transport interface, to generate a special GFP-encapsulated frame upon detecting the failure, and to transmit the special GFP-encapsulated frame over the SONET/SDH transport path to a remote Fibre Channel transport interface to disable a Fibre Channel link from the remote Fibre Channel transport interface to a remote Fibre Channel port; and
at least one processor configured to time the failure of the Fibre Channel link from the local Fibre Channel port to the local Fibre Channel transport interface to determine that the failure is nontransient; and responsive to a determination that the failure is nontransient, to transmit an error condition code in a SONET/SDH path overhead to the remote Fibre Channel transport interface to disable the remote Fibre Channel port link;
whereby a Fibre Channel link from the Fibre Channel port associated with the local Fibre Channel transport interface to the Fibre Channel port associated with the remote Fibre Channel transport interface is emulated.

15. The system of claim 14 further comprising at least one memory subsystem and wherein the processor is configured by software code stored in the memory subsystem.

16. The system of claim 14 wherein the at least one integrated circuit is selected from a group comprising ASICs and FPGAs.

17. The system of claim 14 wherein the at least one processor is further configured to remove the error condition code in the SONET/SDH path overhead transmission to the remote Fibre Channel port to enable the Fibre Channel link from the remote Fibre Channel transport interface to the remote Fibre Channel port.

18. A system for emulating a Fibre Channel link over a SONET/SDH transport path, the system comprising:
at least one processor configured to detect a failure of the SONET/SDH transport path, to time the failure of the SONET/SDH transport path to determine that the failure is nontransient; and responsive to a determination that the failure is nontransient, to disable a Fibre Channel link from a local transport interface to its associated Fibre Channel port.

19. The system of claim 18 wherein the at least one processor is further configured to transmit an error condition code in a SONET/SDH path overhead to a remote Fibre Channel transport interface to disable a Fibre Channel link from the remote Fibre Channel transport interface to its associated Fibre Channel port.

20. The system of claim 19 wherein the at least one processor is further configured to disable a Fibre Channel link by preventing a Fibre Channel port from receiving data from its associated Fibre Channel transport interface.

21. The system of claim 20 wherein the at least one processor is further configured to disable the Fibre Channel link by disabling an associated Fibre Channel transport interface transmit laser to the Fibre Channel port.

22. The system of claim 19 wherein the at least one processor is further configured to detect a return into operation of the SONET/SDH transport path and to time the return to determine that the return is nontransient, and to remove the error condition code in the SONET/SDH path overhead transmission to the remote Fibre Channel transport interface to enable the Fibre Channel link from the remote Fibre Channel transport interface to the remote Fibre Channel port.

23. The system of claim 18 further comprising at least one memory subsystem and wherein the processor is configured by software code stored in the memory subsystem.

24. The system of claim 18 wherein the at least one processor is further configured to detect a return into operation of the SONET transport path and to time the return to determine that the return is nontransient, and to enable the Fibre Channel link responsive to a determination that the return is nontransient.

25. A system for emulating a Fibre Channel link over a SONET/SDH transport path and providing link stability, the method comprising:
means for transporting Fibre Channel data over the SONET/SDH transport path;
means for detecting a SONET/SDH transport path failure;
means for timing the SONET/SDH transport path failure to determine that the failure is nontransient; and
means for disabling a Fibre Channel port link from a local Fibre Channel port to an associated Fibre Channel transport interface upon a determination that failure is nontransient;
wherein inadvertent disabling of the local Fibre Channel link due to transient SONET/SDH error conditions is avoided.

26. The system of claim 25 further comprising means for detecting a return into operation of the SONET/SDH transport path and enabling the Fibre Channel link.

27. The system of claim 26 further comprising means for timing the return into operation of the SONET/SDH transport path failure to determine that the return is nontransient to avoid inadvertent enabling of the Fibre Channel link due to transient SONET/SDH error conditions.

28. The system of claim 25 further comprising means for sending an error condition code in a SONET/SDH path overhead to a remote Fibre Channel transport interface to disable the Fibre Channel link from the Fibre Channel transport interface to an associated Fibre Channel port to emulate a Fibre Channel link from the Fibre Channel port associated with the local Fibre Channel transport interface to the Fibre Channel port associated with the remote Fibre Channel transport interface.

29. The system of claim 28 further comprising means for removing the error condition code in the SONET/SDH path overhead transmission to the remote Fibre Channel transport interface to enable the Fibre Channel port link from the remote Fibre Channel transport interface to the remote Fibre Channel port.

* * * * *